M. J. PAYNE.
TIRE VALVE.
APPLICATION FILED SEPT. 30, 1921.
1,429,047.
Patented Sept. 12, 1922.
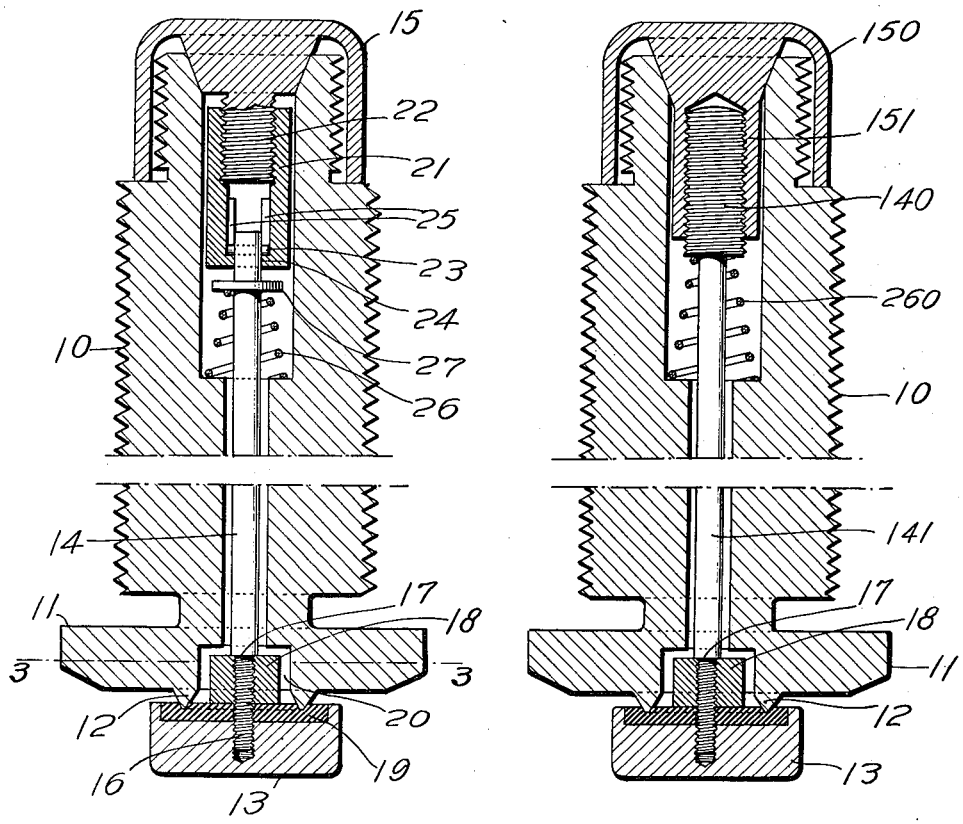
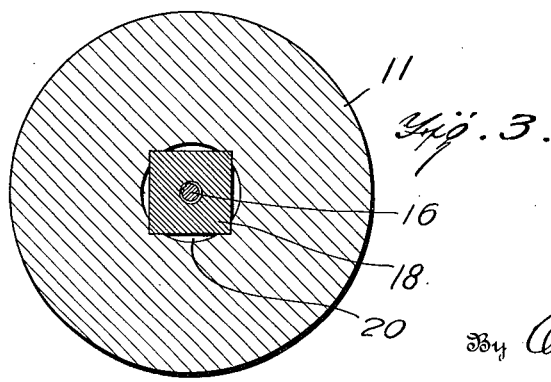
Inventor
Marshall J. Payne
By Chas. J. Williamson
Attorney Patented Sept. 12, 1922.

1,429,047

UNITED STATES PATENT OFFICE.

MARSHALL J. PAYNE, OF STAUNTON, VIRGINIA, ASSIGNOR TO THE PAYNE VALVE CORPORATION, OF STAUNTON, VIRGINIA.

TIRE VALVE.

Application filed September 30, 1921. Serial No. 504,308.

*To all whom it may concern:*

Be it known that I, MARSHALL J. PAYNE, residing at Staunton, county of Augusta, and State of Virginia, a citizen of the United States, have invented certain new and useful Improvements in Tire Valves, of which the following is a specification.

My invention has to do with valves for pneumatic tires, and has for its important object the prevention of air leakage through those passages and joints that are inevitably present in the structure, and to do this by a structure of as few parts as possible and parts in such relation when organized or assembled that assemblage may be readily and quickly accomplished and yet accidental or unintentional separation be impossible. My invention consists not merely in the identical construction shown in the drawings and hereinafter described in detail, but in whatever construction is described by or embraced within the scope or meaning of the appended claims.

In the drawings:—

Fig. 1 is a longitudinal section of a valve embodying my invention;

Fig. 2 is a similar view of a different embodiment.

Fig. 3 is a section on line 3—3 of Fig. 1.

The valve in which I illustrate my invention as embodied is of the type in which the valve head is positively held to its seat without depending upon the air pressure of the inflated tire and in particular to that form of valves of such type in which the valve head engages a seat on the tire stem inside the tire, that seat being on the tire tube clamping head which is carried by the tire stem. The tire stem, 10, shown is or may be of usual construction having at its inner end an annular head, 11, which is clamped against the tire tube on the inside, and which on its face within the tire tube has a seat, 12, in the form of an annular rib or ridge for a valve head, 13, carried at the inner end of a valve stem, 14, that extends outward through the tire stem, 10, and at the outer end is threaded for engagement by a cap, 15, which when turned in one direction operates to draw the stem, 14, outward to seat the valve head, 13, positively against its seat, 12.

The valve head comprises a block of metal with a central threaded hole extending only partially through it by which it is screwed upon the threaded inner end, 16, of the valve stem, which threaded end, 16, is reduced in diameter to provide a shoulder, 17, and between such shoulder and the valve head is a nut, 18. Between the head and said nut is a gasket, 19, which as the nut is screwed tight against the stem shoulder and the block is screwed as far as possible towards the nut, is clamped tightly between the block and nut with the result that the nut is restrained from turning on the stem when the stem tends to rotate and the block is restrained from turning on the stem when the stem tends to rotate, the stem having such tendency when the cap, 15, is rotated to pull the valve head to its seat or to release it so that it may move from its seat during inflation of the tire. The pitch of the thread is such that when the cap, 15, is turned in the direction to draw the valve to its seat, the tendency of the stem is to rotate in the direction to screw the nut all the harder against the stem shoulder, the tendency of the stem to rotate being greatest when the cap, 15, is turned to pull the valve to its seat.

Preferably a coil spring, 26, encircling the valve stem near its outer end and bearing at one end against an annular shoulder, 27, on the valve, and at its other end against an internal shoulder in the tire stem 10, acts to move the valve stem and the attached valve head outward to seat the valve head.

As shown in Fig. 2, the valve seating cap, 150, has a central internally threaded boss, 151, which engages external thread on an enlargement, 140, of the stem, 141, such enlargement and the valve stem being integral and thus the structure does not have the loose connection between the cap-engaging member and the valve stem shown in Fig. 1. In Fig. 2 the coil spring, 260, bears at one end against the inner end of the stem enlargement and at the other end against the bottom of the chamber provided in the tire stem, 10, to accommodate the stem enlargement and the portion of the cap, 150, screwing upon the same.

It will be seen that in both embodiments of my invention shown in the drawings, assembly is effected by passing the valve stem without the valve head thereon through the tire stem, 10, from the outer end, and then screwing the nut and valve head upon the threaded inner end of the stem; and that in both cases there is an enlargement at the inner and outer ends of the stem when the parts are assembled which prevents accidental separation or removal of the valve stem and its associated parts by movement in either direction through the tire stem, 10, even though the valve seating cap should be removed.

It is vital that the turning of the cap, 15, shall not result in turning the stem, 14, so that the only movement of the stem, 14, with the head when the cap, 15, is turned is an axial one toward or from its seat. I utilize the nut, 18, to prevent turning of the stem by making the periphery of the nut noncylindrical, preferably making it square, and providing within the stem head, 11, a cavity or recess, 20, so shaped as to engage the corners or angles of the nut to prevent turning while affording ample space around the nut to allow the passage of air as when the tire is to be inflated.

As shown in Fig. 1, the connection between the valve seating cap, 15, and the valve stem is by means of a sleeve, 21, threaded preferably interiorly to engage a central threaded plug or shank, 22, on the cap, 15, and a loose connection that permits of axial movement of said sleeve without similarly moving the valve is provided, so that should the cap, 15, not be screwed up tightly or omitted, the centrifugal tendency of the sleeve when the wheel rotates will not result in moving the valve from its seat. Such loose connection may be formed by extending the outer end of the valve stem loosely through the inner end of the sleeve, and within the sleeve having a cross bar, 23, that overhangs an internal shoulder, 24, on the sleeve, and at either or both ends enters a groove or grooves, 25, in the interior of the sleeve so that while relative movement of sleeve and valve stem may take place axially, the two are held together for rotation to effect or permit only longitudinal or axial movement of valve stem and sleeve when the cap, 15, is rotated.

What I claim is:

1. The combination of a seat carrying member of a tire valve, a valve head, means positively to move the valve to its seat including a member that moves radially of the wheel, and a loose connection between said member and the valve permitting independent movement of said member under centrifugal force.

2. The combination of a tubular tire stem having a valve seat in its interior end, a valve movable to and from such seat, a valve stem passing through the tire stem, means positively to seat the valve comprising a radially movable member loosely connected with the stem to allow movement of said member under centrifugal force independently of the stem, and a rotary cap engaging said member to move the same radially of the wheel.

3. The combination of a tubular tire stem having a valve seat in its interior end, a valve movable to and from such seat, a valve stem passing through the tire stem, means positively to seat the valve comprising a radially movable member loosely connected with the stem to allow movement of said member under centrifugal force independently of the stem, a rotary cap engaging said member to move the same radially of the wheel, and means to prevent rotary movement of the stem and said member when said cap is rotated.

4. The combination of the seat carrying member of a tire valve, a valve head, a valve stem having a threaded portion engaging a threaded opening in the head, a nut on such threaded portion contiguous to the valve head on one side, a shoulder on the stem engaging the nut on the other side, said seat carrying member having a recess loosely surrounding the nut with a surface to engage the nut periphery formed to prevent turning of the nut and means to positively seat the valve comprising a rotary cap having a threaded connection with the valve stem.

In testimony whereof I hereunto affix my signature.

MARSHALL J. PAYNE.